United States Patent [19]

Matusz

[11] Patent Number: 4,644,908
[45] Date of Patent: Feb. 24, 1987

[54] STEAM GENERATOR WRAPPER CLOSURE AND METHOD OF INSTALLING THE SAME

[75] Inventor: John M. Matusz, Plum Boro, Pa.

[73] Assignee: Westinghouse Electric Corp., Pittsburgh, Pa.

[21] Appl. No.: 670,793

[22] Filed: Nov. 13, 1984

[51] Int. Cl.[4] .............................................. F22B 37/10
[52] U.S. Cl. .................................... 122/511; 122/360; 122/379; 122/512; 165/71; 165/76; 165/11.1; 376/249; 376/260; 376/463
[58] Field of Search .............. 122/379, 510, 511, 512, 122/360, 365, 32; 165/11 R, 71, 76, 79; 376/294, 249, 260, 463

[56] References Cited

U.S. PATENT DOCUMENTS

| | | | |
|---|---|---|---|
| 2,688,315 | 9/1954 | Davy | 122/360 |
| 3,352,756 | 11/1967 | Lockett et al. | 376/463 X |
| 3,550,561 | 12/1970 | Evans | 122/360 X |
| 3,850,795 | 11/1974 | Thome | 376/463 |
| 4,037,569 | 7/1977 | Bennett et al. | 122/32 |
| 4,143,708 | 3/1979 | Haynes | 165/76 |
| 4,312,708 | 1/1982 | Leslie | 376/463 X |

FOREIGN PATENT DOCUMENTS 1215560 12/1970 United Kingdom .

Primary Examiner—Albert J. Makay
Assistant Examiner—Steven E. Warner
Attorney, Agent, or Firm—L. A. DePaul

[57] ABSTRACT

A steam generator wrapper closure and a method of installing the same includes a plug member (108) which includes a large diameter portion (110) and a small diameter portion (112) with an annular shoulder portion (114) defined therebetween. A locking pawl (124) is rotatably mounted upon the plug (108) through means of its shaft (122). A pawl shaft extension rod (154) and a handle (150) are utilized to manipulate the pawl (124) and the plug (108) from a position external to the steam generator outer shell (16). The axis of the pawl shaft (122) is radially offset with repect to the axis of the plug (108), and the diametrical extent of the pawl (124) is less than that of the small diameter portion (112) of the plug (108). In this manner, when the pawl (124) is rotated to a first position within which the pawl (124) is disposed within the circumferential boundary of the small diameter portion (112) of the plug (108), the pawl (124) and small diameter plug portion (112) may be inserted within the wrapper penetration (104) until the shoulder portion (114) of the plug (108) engages the exterior surface (118) of the wrapper (46). The pawl (124) may then be rotated to a diametrically opposite position within which the pawl (124) engages the interior surface (138) of the wrapper (46) thereby lockingly retaining the plug member (108) within the wrapper penetration (104).

19 Claims, 4 Drawing Figures

STEAM GENERATOR WRAPPER CLOSURE AND METHOD OF INSTALLING THE SAME

BACKGROUND OF THE INVENTION

1. Field of the Invention

The present invention relates generally to nuclear reactor steam generators, and more particularly to a closure for a steam generator wrapper penetration or access opening, and a method of installing the same within the wrapper from a position external to the steam generator pressure vessel or outer shell, such that once the wrapper penetration or access opening has been utilized for its intended purposes, the penetration or opening may be closed and the fluidic integrity of the generator wrapper restored.

2. Description of the Prior Art

A nuclear reactor produces heat as a result of the fission of nuclear material which is disposed within fuel rods, and the fuel rods are secured together in predetermined arrays so as to define fuel assemblies. The fuel assemblies, in turn, define the nuclear reactor core, and the core is disposed within a reactor or pressure vessel. In commercial nuclear reactor facilities, the heat produced by means of the aforenoted fission processes is utilized to generate electricity. In particular, a conventional facility may comprise, for example, a primary coolant flow and heat exchange or transfer loop to which conventional steam generators and steam turbines, as well as electrical generators, are fluidically and mechanically connected, respectively. A typical energy conversion process for such commercial nuclear reactor facilities would therefore comprise, for example, the transfer of heat from the nuclear reactor core to the primary coolant flow and loop system, and from the primary coolant flow and loop system to the steam generators by means of suitable heat exchangers incorporated within the steam generators. The steam generated within the steam generators is then of course transmitted to the steam turbines to which the electrical generators are operatively connected, and from which electricity is ultimately generated.

With reference initially being made to FIG. 1 of the drawings, a conventional steam generator structure or facility is disclosed. In particular, the steam generator is seen to comprise a vertically oriented, elongated entity which includes a hollow, substantially cylindrical pressure vessel or outer shell 12 having an upper shell section 14, a lower shell section 16, and a transition zone section 18 integrally interconnecting together the upper and lower shell sections 14 and 16. The diametrical extent of the upper shell section 14 is greater than that of the lower shell section 16, and consequently, the transition zone section 18 has the configuration of a conical frustum. A multitude of steam generator heat exchanger tubes 20 extend vertically within the central portion of the lower shell section 16 of the steam generator so as to define together a tube bundle. The uppermost portion of each of the tubes 20 extends upwardly within the transition cone section 18 of the steam generator and is seen to have an inverted U-shaped configuration. In this manner, the lower extremities of each tube 20 can be fixedly secured within a tube sheet 22 disposed within the lower end of the lower shell section 16. Integrally formed or secured to the outer periphery of the lower end of the lower shell section 16 within virtually the same horizontal plane as that of the tube sheet 22 is an annular support ring 24 by means of which the entire steam generator structure is capable of being supported upon the nuclear reactor facility or plant foundation. The lowermost end of the steam generator lower shell section 16 is sealingly enclosed by means of a hemispherically shaped shell portion 26, and disposed within hemispherical shell 26 is a vertically oriented divider plate 28 which serves to divide hemispherical shell 26 into two spherical quadrants. As may readily be appreciated, each of the quadrants is fluidically connected to one of the extremities of each of the heat exchanger tubes 20, and the quadrants are also provided with a fluid nozzle 30 and 32, respectively, which serve to introduce nuclear reactor core coolant into, and discharge nuclear reactor core coolant from, the steam generator. In this manner, during operation of the nuclear facility, primary core coolant is conducted throughout its heat exchange or transfer loop from the nuclear reactor core, not shown, through inlet nozzle 30, the left steam generator hemispherical shell quadrant 34, the steam generator tube bundle U-shaped heat exchanger tubes 20, the right steam generator hemispherical shell quadrant 36, as viewed in FIG. 1, outlet nozzle 32, and back to the nuclear reactor core.

In order to provide for the generation of steam within the steam generator, an inlet feedwater nozzle 38 is provided within a sidewall portion of the upper shell section 14 of the steam generator, and a water conduit 40 is disposed internally of nozzle 38. The conduit 40 is integrally connected with an annular manifold 42 which has operatively associated, in a fluidically connected manner, a multitude of upstanding, inverted J-tubes or nozzles 44 through means of which the incoming feedwater is projected downwardly in cascading sheets. In order to define a flowpath for the cascading water flowing downwardly through the steam generator, the entire tube bundle is enveloped or encased within a cylindrical tube wrapper 46 which extends vertically, and substantially concentrically, within the lower and transitional zone sections 16 and 18 of the steam generator shell 12, the tube wrapper 46 being fixedly secured within the shell 12 by suitable means, not shown. In this manner, the tube wrapper 46 and the lower and transitional zone sections 16 and 18 of the shell 12 serve to define an annular downcomer region 48 through which the water flows downwardly toward the bottom of the steam generator facility. It is seen that the lower peripheral edge of the tube wrapper 46 is suspended above the upper surface of the tube sheet 22 whereby a transverse flow region is defined between the downcomer region 48 of the generator and the tube bundle section of the generator which is disposed internally of the tube wrapper 46. The water therefore enters the tube bundle section of the generator, and the heat exchange process between the water and the heat tube bundle tubes 20, through which the hot reactor core coolant is being conducted and circulated, begins to take place with the water passing between all of the heat exchange tubes 20. As a result, steam is generated, and the water and steam flow upwardly through the entire tube bundle, between the tubes 20, under natural convection. In order to provide lateral support and stabilization for the heat exchange tubes 20 throughout their vertical extent, a plurality of horizontally disposed, vertically spaced tube support plates 50 are fixedly secured to the interior wall surface of the tube wrapper 46. As is conventional, the heat exchanger tubes 20 pass through holes or apertures 52 defined within the tube support plates 50, there being sufficient spatial clearance defined between the tubes 20 and the plate apertures or holes 52 so as to provide for the desired, limited lateral support and restricted movement of the tubes 20, in response to the water flow thereabout as well as thermal expansion and contraction conditions, without hindering the passage therethrough of the water and steam flowing upwardly through the generator. It is to be further noted that in view of the U-shaped configuration of the tubes 20, a tube-passageway or lane 54 is defined between the legs of the tubes 20, and within each of the horizontally disposed support plates 50, with the exception of the lowermost plate 50', there are defined a plurality of radially aligned slots 56 through which water and steam may likewise pass from one vertically spaced or defined section of the generator heat exchanger portion to another. The lowermost support plate 50' has the configuration of an annular disc with the central portion thereof open, and in this manner, the plate 50' serves as a flow distribution baffle which effectively causes a high percentage of the incoming water to flow from the radially outer portion of the tube bundle section of the steam generator, beneath the undersurface of the plate or baffle 50', and upwardly through the large central aperture defined within the plate or baffle 50', with the remaining portion of incoming water flow passing upwardly through the apertures or holes 52 defined within plate or baffle 50' Water and steam can therefore flow upwardly through the various vertically spaced stages of the heat exchanger, through means of the holes or apertures 52, as well as the slots 56 and the lanes 54, in a predeterminedly defined pattern which seeks to achieve flow uniformity. In addition to the support plates 50, antivibration bars 58 may be provided within the uppermost portion of the wrapper 46 so as to engage the uppermost, U-shaped bent sections of the heat exchanger tubes 20 for likewise performing restrictive and stabilizing functions with respect to tubes 20 in a manner similar to that of support plates 50 under steam and water flow, as well as thermal expansion and contraction, conditions. As a result, excessive wear of the heat exchanger tubes 20 is effectively prevented or substantially reduced, as is vibrational noise.

The upper end of the steam generator heat exchanger tube wrapper 46 is integrally provided with a horizontally disposed deck or cover 60 so as to seal the interior of the wrapper 46 within which the heat exchanger U-bent tubes 20 are disposed, however, in order to permit the upward escape of the generated steam from the heat exchanger portion of the generator and out of the wrapper 46, a plurality of holes or bores 62 are defined within the cover or deck 60. A plurality of upstanding swirl vane primary moisture separators 64, in the form of, for example, cylindrical tubes approximately twenty inches (20") in diameter, are vertically supported atop tube wrapper deck or cover 60 with the lower ends thereof respectively in fluidic communication with the apertures or holes 62. A pair of horizontally disposed, vertically spaced lateral support plates 66 are fixedly secured with respect to the moisture separator tube systems at the upper ends and the axially central portions thereof, and in particular, it is seen that a plurality of apertures 68 are defined within the axially central or lower support plate 66 so as to permit the separator tubes 64 to pass therethrough. A plurality of outer cylindrical casings 70 concentrically surround those portions of the swirl vane separator tubes 64 which are interposed between the lateral support plates 66, and the upper ends of the casings 70 are in contact with the undersurface of the lower lateral support plate 66. Orifice bushings 72, having a diametrical extent which is less than that of the casings 70, are disposed within apertures 74 defined within the upper lateral support plate 66 such that the upper ends of the bushings 72 extend slightly above the upper surface of the upper support plate 66 while the lower ends of the bushings 72 are disposed within the upper ends of the casings 70. The upper ends of the swirl vane separator tubes 64 terminate at a level within the casings 70 which is below that of upper lateral support plate 66, and in this manner, water thrown radially outwardly under centrifugal force as a result of the passage of the water/steam mixture through the swirl vane separator tubes 64, and in particular past the swirl vane separators 76 respectively disposed within each tube 64, can collect upon the inner surface of each casing 70 while the steam can continue to travel axially upwardly so as to pass through the upper ends of the separator casings 70 and orifice bushings 72. The lower ends of the casings 70 are provided with rectangularly shaped cutouts or apertures 78 so as to permit the aforenoted separated water to pass outwardly therethrough and over the peripheral edge of the lower lateral support plate 66 and be discharged back into the downcomer region 48 for recirculation back upwardly through the heat exchanger tube bundle within wrapper 46.

Within the uppermost section of the steam generator shell portion 14, there is defined a steam dome chamber 80 into which the steam exiting from the orifice bushings 72 enters, and within which there is disposed a plurality of stacked positive entrainment steam dryers 82. The dryers 82 have the configurations of cubes or rectangular parallelepipeds, and the upper surface of the upper dryer 82 is open so as to mate with a similarly configured cut-out or aperture 84 defined within a divider plate 86 disposed within the steam dome chamber 80. In this manner, the steam exiting from the orifice bushings 72 and passing into the steam dome chamber 80 is forced to enter the sidewalls of the dryers 82 before being further passed through dryers 82 and upwardly out of dryer opening 84 for discharge from the steam generator through means of an axially upstanding steam nozzle 88 disposed atop the steam generator. The dryers 82 serve to separate any remaining or residual water vapor entrained within the steam before the latter is conducted to the steam nozzle 88 for further passage to the steam turbines and electrical generators, not shown, and any such separated water is conducted vertically downwardly to a suitable pool or reservoir 89, defined within the central portion of the wrapper deck or cover 60, by means of an axially central drain pipe 90 dependently fixed to the floor 92 of the lower dryer 82. The lower terminal end of pipe 90 is vertically spaced above wrapper deck or cover 60, and in this manner, the water collected within reservoir or pool 89 may ultimately flow radially outwardly over the wrapper deck or cover 60 so as to cascade downwardly into the annular downcomer region 48 in a manner similar to the separated water exiting from the cut-outs or apertures 78 defined within the separator casings 70.

Having now generally described the structural composition of a conventional steam generator, it is well known that various holes, apertures, or bores are provided within various different sidewall portions, for example, of the steam generator wrapper for various different purposes, such as, for example, to house various different types of instrumentation necessary to the operation or monitoring of the operation of the generator, to provide visual inspection means within the generator, to provide manipulative access means within the generator wrapper so as to facilitate, for example, the removal or replacement of various parts of the generator, and the like. Upon completion of the various operational inspection apparatus, measuring or monitoring instrumentation or equipment, or the maintenance or repair apparatus, the wrapper through-bores must be closed and sealed so as to restore the fluidic integrity or boundary defined within the steam generator by means of the generator wrapper. Heretofore, while such penetrations also encompassed appropriate bores or access openings likewise defined within the steam generator outer shell or pressure vessel, closure of the shell or vessel could be readily accomplished in view of the fact that both maintenance personnel and the necessary tool systems and equipment would be disposed externally of the shell or vessel. In order to similarly accomplish the closure and sealing of the generator wrapper, however, such procedures must of necessity be able to be accomplished within the restricted confines defined interiorly of the pressure vessel or outer shell which has heretofore proven to be difficult to achieve. In addition, prior art wrapper closure designs or systems were operatively affixed upon the pressure vessel or outer shell, and consequently, such designs or systems severely limited the relative movement of the generator wrapper with respect to the generator outer shell or pressure vessel under both fluid flow pressure differential, as well as thermal contraction and expansion differential, conditions. If a predetermined amount of relative movement of the generator wrapper relative to the generator vessel or shell is not permitted, then deleterious stresses would be induced within the wrapper under such pressure and thermal differential conditions, whereby, ultimately, rupture, corrosive fatigue, and the like, would probably manifest itself within the generator wrapper.

Accordingly, it is an object of the present invention to provide a new and improved steam generator tube bundle wrapper closure plug assembly and a method of installing the same.

Another object of the present invention is to provide a new and improved steam generator tube bundle wrapper closure plug assembly, and a method of installing the same, which overcomes various noted characteristics associated with conventional generator wrapper closure assemblies.

Still another object of the present invention is to provide a new and improved steam generator tube bundle wrapper closure plug assembly, and a method of installing the same, which may be simply and readily installed within the steam generator tube bundle wrapper from a position external to the steam generator outer shell or pressure vessel.

Yet another object of the present invention is to provide a new and improved steam generator tube bundle wrapper closure plug assembly, and method of installing the same, which does not adversely affect the limited movement of the wrapper relative to the steam generator outer shell or pressure vessel under differential pressure or thermal conditions.

Still yet another object of the present invention is to provide a new and improved steam generator tube bundle wrapper closure plug assembly, and a method of installing the same, wherein the assembly is, in effect, a self-contained unit which facilitates insertion, installation, and fixation of the closure assembly within and upon the steam generator wrapper so as to restore the integrity of the fluidic boundary defined by means of the steam generator wrapper.

Yet still another object of the present invention is to provide a new and improved steam generator tube bundle wrapper closure plug assembly, and a method of installing the same, wherein the assembly is particularly well-suited for the sealing and closing of "hillside-type" penetrations defined within a steam generator tube bundle wrapper, "hillside-type" penetrations being those penetrations which extend in a radially oriented direction through both the steam generator outer shell or pressure vessel, and the tube bundle wrapper, however, the penetrations are not in fact radially aligned so as to facilitate, for example, the insertion or introduction of suitable instrumentation or inspection equipment without interfering with, encountering, or damaging the U-shaped heat exchanger tubes housed internally within the steam generator wrapper.

SUMMARY OF THE INVENTION

The foregoing and other objectives are achieved in accordance with the present invention through the provision of a steam generator tube bundle wrapper closure plug assembly which comprises a stepped plug as defined by means of a forwardly extending smaller diameter portion, and a rearward larger diameter portion integral with the smaller diameter portion.

An annular shoulder is thus defined between the two cylindrical portions, and in this manner, when the plug assembly is inserted through the steam generator tube bundle wrapper penetration, the smaller diameter cylindrical portion of the plug will be disposed within the penetration bore while the larger cylindrical portion of the plug will be disposed externally of the wrapper with the shoulder portion of the plug in contact with the outer surface of the wrapper.

In order to lockingly retain or affix the plug assembly within the wrapper penetration bore, a pawl is rotatably mounted upon the stepped cylindrical plug about an axis radially offset from the stepped plug axis. The forward free face of the small diameter cylindrical portion of the plug is also provided with a diametrically extending slot, and the diametrical extent of the pawl is less than that of the small diameter cylindrical portion of the plug. In this manner, when the plug assembly is initially inserted within the wrapper penetration bore or aperture, the pawl is rotated to a first position within which the pawl does not extend beyond the circumferential boundary of the small diameter cylindrical portion of the plug. Once the plug is inserted within the wrapper penetration bore, the pawl is rotated 180° to a second position at which the pawl now extends beyond one sidewall section of the circumferential boundary of the small diameter cylindrical portion of the plug so as to engage the interior wall surface of the steam generator tube bundle wrapper. The pawl is also adapted to be disposed within the plug's diametrically extending slot upon being rotated to the aforenoted second position so as to prevent retrograde rotation of the pawl back to its initial first position, and subsequently, the pawl and plug members may be axially tightened with respect to each other by means of a lockwasher and nut assembly. The lockwasher is adapted to be tack-welded to the plug member, and is also provided with bendable tabs for tack-welding to the nut. The pawl is mounted upon one end of a shaft which is threaded at its other end for threaded engagement with the nut. In the instance that the closure plug assembly of the present invention is to be utilized in connection with the sealing or closing off of "hillside-type" penetrations defined within the tube bundle wrapper, the mating faces of the plug and pawl members of the assembly are inclined with respect to their respective axes at angles matching that of the angle of inclination of the penetration bore as defined within the steam generator tube bundle wrapper.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENT

Figure 1:
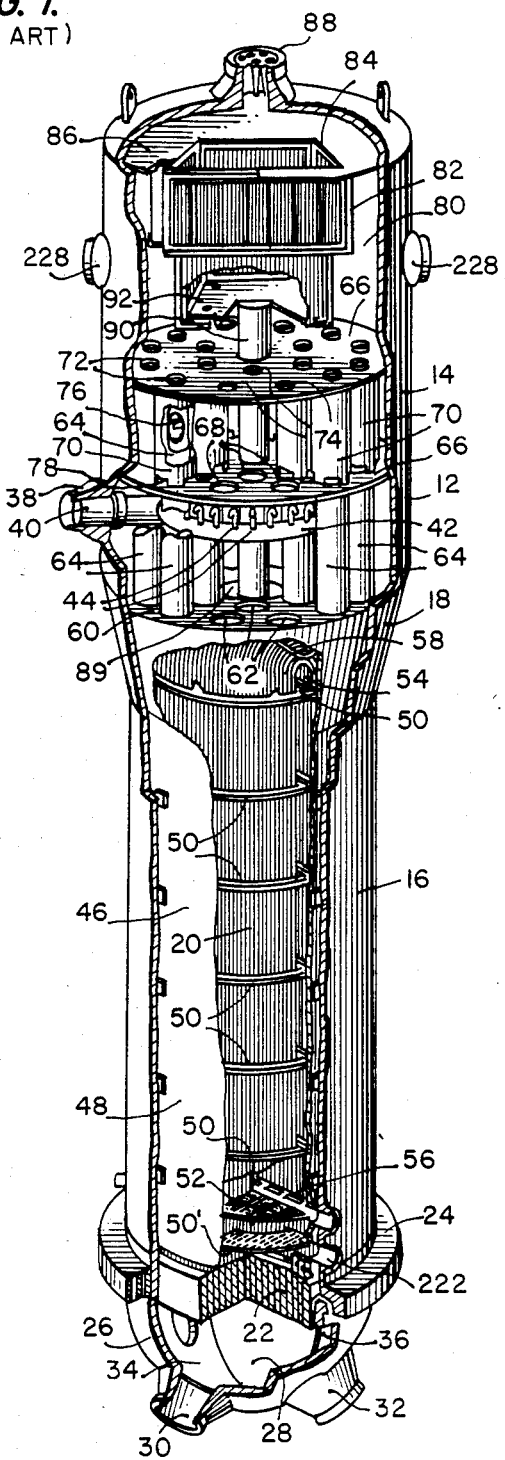
FIG. 1 is a perspective view of a conventional nuclear reactor steam generator showing the cooperative parts thereof.
Figure 2:
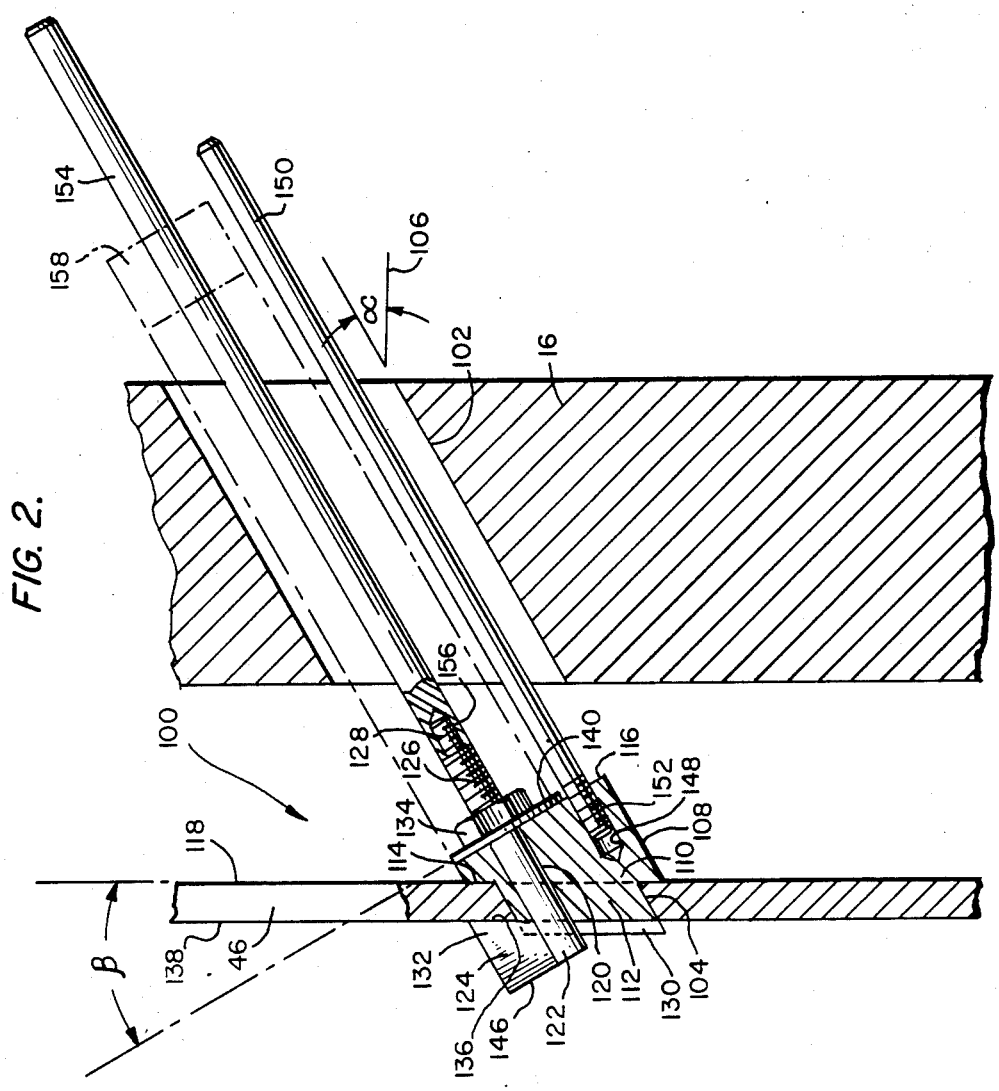
FIG. 2 is a horizontal cross-sectional view of the new and improved steam generator tube bundle wrapper closure plug assembly constructed in accordance with the present invention, showing the cooperative parts thereof, and illustrated as being utilized for the installation of the closure plug within the steam generator tube bundle wrapper penetration or bore, the plug and pawl assembly having been lockingly affixed upon the tube bundle wrapper and prior to the removal of the torque tool, handle, and pawl extension components of the entire plug assembly.

Referring again to the drawings, but with particular reference now being made to FIG. 2 thereof, there is illustrated the new and improved steam generator tube bundle wrapper closure plug assembly constructed in accordance with the present invention and generally indicated by the reference character 100. As can be seen from the drawing figure, the steam generator outer shell or pressure vessel 16, as well as the tube bundle wrapper 46, have been provided with "hillside-type" penetrations 102 and 104, respectively, which are coaxially aligned with respect to each other, and which extend in a generally radial direction but oriented at an angle $\alpha$ of approximately 25° with respect to the true radii of the steam generator as denoted at 106. As is well-known, such "hillside-type" penetrations within steam generator facilities facilitate the installation of inspection equipment, measuring and monitoring instrumentation, and the like, within the steam generator tube bundle wrapper 46 so as not to operatively interfere with, encounter, or otherwise damage, the U-shaped heat exchange tubes 20. As has been noted hereinbefore, upon completion of particular inspection, monitoring, or the like, procedures, the various inspection equipment, measuring and monitoring instrumentation, and the like, are removed from the wrapper penetration 104, and accordingly, the penetration 104, as well as the penetration 102 defined within the steam generator outer shell or pressure vessel 16, must be closed and sealed so as to restore the integrity of the generator to its original condition prior to the installation of the aforenoted inspection equipment, measuring and monitoring instrumentation, and the like. The closure plug assembly 100 of the present invention is concerned with the closure and sealing of the penetration 104 defined within the steam generator tube bundle wrapper 46.

In accordance then with the present invention, the closure plug assembly 100 is seen to comprise a substantially cylindrical plug member 108 which has a stepped configuration as defined by means of a first, large diameter cylindrical plug base portion 110, and a second, small diameter cylindrical plug forward portion 112 integrally formed with the base portion 110. As a result of the stepped configuration of the plug member 108, an annular shoulder portion 114 is defined between the base and forward portions 110 and 112 of the plug 108. In order to accommodate the "hillside-type" penetration 104 defined within the steam generator tube bundle wrapper 46, as well as to in fact permit the plug member 108 to be properly seated within the wrapper 46 so as to close off and seal the wrapper penetration 104, it is noted that the annular surface of the shoulder portion 114 is formed at an angle $\beta$ of approximately 25° with respect to the base surface 116 of the plug member 108, it being further appreciated that angles $\alpha$ and $\beta$ will of course be equal to each other so as to in fact achieve the aforenoted proper seating of the plug member 108 within the wrapper penetration 104. It is additionally to be noted at this junction that in order to in fact accommodate the closure plug member 108 within wrapper penetration 104, the diametrical extent of the plug forward portion 112 must be slightly smaller than the diametrical extent of the wrapper penetration 104. In view of the fact that the penetration 104 defined within the steam generator wrapper 46 is made at a predetermined angle $\alpha$ with respect to the true radii of the wrapper, the penetration 104 of the wrapper will actually have an elliptical configuration, however, for the purposes of this discussion, such has been treated as being substantially circular, and hence, such is the basis for the comparison of the diametrical extents of the wrapper penetration 104 and the plug portion 112. It is of course appreciated that in view of the additional fact that the plug base portion 110 has a diametrical extent greater than that of the forward plug portion 112, the shoulder portion 114 of the plug member 108 will abut the outer surface 118 of the steam generator wrapper 46 when the plug member 108 is properly seated within the wrapper penetration 104.

A through-bore 120 is defined within the plug member 108 at a position radially offset from the axis of the plug member 108, and the bore 120 is seen to extend completely through both the base portion 110 and the forward portion 112 of the plug member 108. A pawl shaft 122 is adapted to be freely rotatable and slideable within the through-bore 120, and it is seen that the interior end of the pawl shaft 122 is provided with an integral pawl member 124, while the exterior end of the pawl shaft 122, as considered relative to the steam generator wrapper 46, is threaded as at 126, threaded end 126 further including a threaded extension or rod 128 which has a diametrical extent which is less than that of the pawl shaft 122. The pawl member 124 is in the form of a flat plate having a predetermined thickness, and the configuration of the pawl member 124 is that of a truncated right-triangle. The forward or interior surface of the forward portion 112 of the plug member 108 has a lineal or diametrically extending slot 130 defined therein, and the width or thickness of the slot 130 is slightly greater than the thickness of the pawl member 124 so as to accommodate the same as will become more apparent hereinafter. Diametrical slot 130 intersects through-bore 120 of plug member 108, and in this manner, pawl member 124 can in fact be accommodated within the slot 130 so as to in fact permit both installation of the plug assembly 100 within the steam generator wrapper 46, as well as the fixation or locking of the plug member 108 within the wrapper penetration 104.

Figure 3:
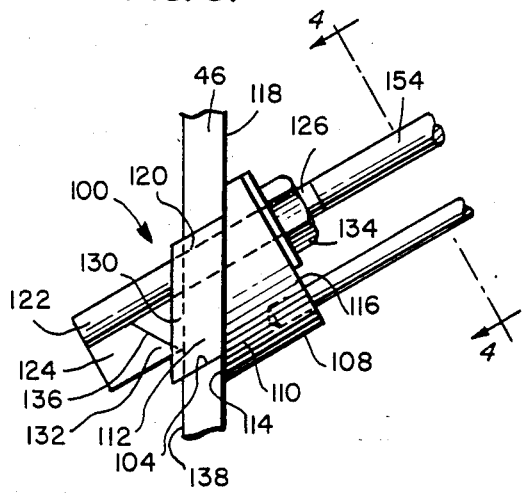
FIG. 3 is a view similar to that of FIG. 2, illustrating, however, the disposition of the pawl component of the plug assembly, relative to the remainder of the plug assembly, upon initial insertion of the plug assembly into the steam generator tube bundle wrapper penetration and prior to fixation of the assembly within the wrapper penetration as illustrated in FIG. 2.

In particular, it is seen that the radial dimension or height of the pawl member 124, as best seen from FIG. 3, is such that the diametrical dimension of both the pawl shaft 122 and the pawl member 124 is less than the diametrical extent of the small diameter forward portion 112 of the plug member 108, and in this manner, when the pawl shaft is rotated so as to dispose the pawl member 124 in a first position as shown in FIG. 3, the pawl member 124 is disposed entirely within the circumferential extent or boundary of the small diameter forward portion 112 of the plug member 108. The free triangular apex portion 132 of the pawl member 124 may at this time be disposed within the diametrical slot 130 of the small diameter forward portion 112 of the plug member 108 so as to prevent inadvertent rotation of the pawl member 124 about the axis of its shaft 122, whereby interference between the pawl member 124 and the wrapper 46 is prevented. Consequently, the plug assembly comprising the plug member 108 and the pawl member 124 may be easily and simply inserted through the wrapper penetration 104 as shown in FIG. 3. A standard hexagonal nut 134 is threadedly engaged with the threaded portion 126 of the pawl shaft 122, and once the plug assembly comprising plug member 108 and pawl member 124 has been inserted through the wrapper penetration 104, the nut 134 may be loosened upon the threaded shaft portion 126 so as to permit the pawl assembly comprising pawl shaft 122 and pawl member 124 to be moved in their axial direction so as to free the apex portion 132 of the pawl member 124 from the plug slot 130. The pawl assembly comprising the pawl shaft 122 and the pawl member 124 may then be rotated through an angle of 180° so as to bring the pawl member 124 into a second position as shown in FIG. 2. When the pawl member 124 is disposed in its second position, and the pawl assembly comprising the pawl shaft 122 and the pawl member 124 is moved in their axial direction opposite that of the first axial movement, the hypotenuse portion 136 of the pawl member 124 will now not only be disposed within that portion of the plug diametrical slot 130 which is disposed upon the opposite side of pawl shaft 122 than that portion within which triangular apex portion 132 of the pawl member 124 was initially engaged, but in addition, pawl portion 136 engages the interior surface 138 of the steam generator wrapper 46. Upon threadedly tightening nut 134 upon the threaded portion 126 of the pawl shaft 122, the entire plug closure assembly comprising plug member 108 and pawl member 124 is fixedly retained upon the steam generator wrapper 46 and within the wrapper penetration 104. By means of the disposition of the pawl member 124 within the slot 130 of plug portion 112 as shown in FIG. 2, the closure assembly cannot be, or inadvertently come, dislodged from the wrapper 46 and its penetration 104 unless of course nut 134 somehow underwent retrograde threaded disengagement relative to pawl shaft threaded portion 126.

Figure 4:
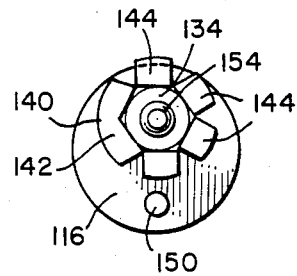
FIG. 4 is a front elevation view of the plug assembly of FIG. 3 as taken along the lines 4—4 of FIG. 3.

In order to prevent the aforenoted retrograde threaded disengagement of the nut 134 relative to the pawl shaft threaded portion 126, a lockwasher 140 is interposed between the base surface 116 of the plug member 108 and the hex nut 134, and the washer 140 is tack-welded to plug member 108. As best seen in FIG. 4, the washer 140 comprises a main portion 142 and a plurality of tabs 144 arranged in a circumferential array. The tabs 144 are all integrally connected to the primary portion 142, which includes an annular portion, not shown, disposed about pawl shaft 122 and beneath hex nut 134, and are bendable so as to be capable of contacting the sidewalls of the hex nut 134 to which the tabs 144 may also be tackwelded. Consequently, once the nut 134 has been fully threadedly engaged or tightened upon pawl shaft threaded portion 126 so as to in fact bring pawl member 124 into plug member slot 130, as well as into engagement with the interior wall surface 138 of the steam generator wrapper 46, the entire closure plug assembly comprising plug member 108 and pawl member 124 will be fixedly retained upon the wrapper 46 and within the penetration 104. It is additionally to be noted that in order to achieve the fixed engagement of the pawl member 124 with the interior surface 138 of the steam generator wrapper 46, the forwardmost surface of the small diameter plug portion 112, within which diametrical slot 130 is defined, is formed at an angle relative to the base surface 116 of the plug member 108 which is the same as the angle $\beta$ which defines the plane within which the annular shoulder portion 114 of the plug member 108 is disposed. In this manner, the forwardmost surface of the plug portion 112 is disposed parallel to the interior surface 138 of the steam generator wrapper 46, and the hypotenuse portion 136 of the pawl member 124, also formed at the same angle relative to the base end 146 of the pawl member 124, is in fact able to engage plug slot 130 as well as wrapper interior surface 138. It is still further noted that once the entire closure assembly comprising plug member 108 and pawl member 124 is installed upon wrapper 46 and within penetration 104, rotation of the entire assembly relative to the wrapper 46 and about an axis perpendicular to the plane of the wrapper 46 is prevented as a result of the attempted rotation of the elliptical portion of the plug section 112 within the wrapper penetration 104 which, as noted hereinbefore, also has an elliptical configuration. Similarly, rotation of the entire assembly comprising the plug member 108 and the pawl member 124 about the axis of the plug member 108 is prevented in view of the fact that attempted rotation of the entire assembly would force the pawl member 124 and the plug member 108 to respectively become embedded within the interior and exterior surfaces 138 and 118 of the wrapper 46.

With reference still being made to FIGS. 2, 3, and 4, in order to facilitate manipulation of the closure plug member 108 and the pawl member 124 with respect to the wrapper 46 and the wrapper penetration 104, the plug base section 110 is further provided with an axially extending blind bore 148 at a position radially offset from the axis of the plug member 108, and the interior of the bore 148 is threaded so as to threadedly mate with a manipulative handle rod or shaft 150 which is externally threaded at one end thereof as at 152. Once the plug assembly comprising plug member 108 and pawl member 124 has been properly seated within the wrapper penetration 104, the handle rod 150 may be unthreaded from the bore 148.

In a similar manner, in order to appropriately move the pawl member 124 and its shaft 122 in both the axial direction, as well as the rotational mode, during mounting of the closure plug assembly within the wrapper penetration 104 as seen in FIGS. 2 and 3, a pawl extension 154, in the form of a rod, has an internally threaded blind bore 156 defined at its forward end for threadedly mating with the pawl shaft extension 128. Again, upon completion of the mounting procedure of the closure plug member 108 and the pawl member 124 relative to wrapper penetration 104, the pawl extension rod 154 may be unthreaded from the pawl shaft extension 128. Such removal of both the pawl extension rod 154 and the manipulative handle rod 150 are of course accomplished after the plug member 108 and the pawl member 124 have both been properly seated and secured relative to wrapper 46 and within wrapper penetration 104 as a result of the threaded engagement of the hex nut 134 upon the pawl shaft 126, and the tack-welding of the lockwasher tabs 144 to the sidewalls of the hex nut 134. In order to achieve the threading processes of the hex nut 134 upon the pawl shaft 126, a tubular torque tool 158 is slideably accommodated in the axial direction over the pawl extension 154 such that the forward end of the torque tool 158 is able to engage the hex nut 134, all as best seen in FIG. 2.

Obviously, many modifications and variations of the present invention are possible in light of the above teachings. It is therefore to be understood that within the scope of the appended claims, the present invention may be practiced otherwise than as specifically described herein.

I claim:

1. A steam generator, comprising:
   a wrapper having an interior surface adapted to circumferentially envelope a plurality of heat exchange tubes;
   means defining a penetration within said heat exchange tube wrapper;
   plug means for closing said heat exchange tube wrapper penetration comprising a first cylindrical portion having a diametrical extent slightly less than the diametrical extent of said penetration so as to permit said first cylindrical portion to be disposed within said wrapper penetration; and
   a second cylindrical portion having a diametrical extent greater than said diametrical extent of said first cylindrical portion so as to define with said first cylindrical portion an annular shoulder portion for engagement with the exterior surface of said heat exchange tube wrapper when said first cylindrical portion of said plug means is disposed within said wrapper penetration; and
   means rotatably mounted upon said plug means for lockingly retaining said plug means upon said heat exchange tube wrapper and within said heat exchange tube wrapper penetration.

2. A steam generator as set forth in claim 1, wherein: said locking means comprises a triangularly shaped plate-type pawl.

3. A steam generator as set forth in claim 1, wherein: the axis of said penetration is disposed at a predetermined angle relative to said heat exchange tube wrapper; and
   said plug means and said locking means are provided with surfaces, for engagement with said heat exchange tube wrapper, which have an angular orientation the same as that of said predetermined angle.

4. A steam generator as set forth in claim 1, further comprising:
   an interiorly threaded blind bore defined within said plug means; and
   handle means threadedly engaged within said blind bore for manipulating said plug means relative to said wrapper penetration.

5. A steam generator as set forth in claim 4, wherein: said blind bore is defined within said plug means at a position radially offset from the longitudinal axis of said plug means.

6. A steam generator as set forth in claim 4, further comprising:
   an outer shell disposed substantially concentrically about said heat exchange tube wrapper;
   means defining a penetration within said outer shell; and
   said handle means is disposed through said outer shell penetration,
   whereby said plug means can be manipulated relative to said heat exchange tube wrapper from a position external to said steam generator outer shell.

7. A steam generator as set forth in claim 1, wherein: said locking means is rotatably mounted upon said plug means between a first position which permits said locking means and said first cylindrical portion of said plug means to be inserted through said wrapper penetration, and a second position at which said locking means engages the interior surface of said heat exchange tube wrapper so as to retain said plug means upon said wrapper.

8. A steam generator as set forth in claim 7, wherein: the diametrical extent of said locking means is less than said diametrical extent of said first cylindrical portion of said plug means so as to permit said locking means to be disposed within the circumferential boundary of said first cylindrical portion of said plug means when said locking means is disposed within said first position.

9. A steam generator as set forth in claim 8, wherein: said locking means has its rotational axis radially offset with respect to the longitudinal axis of said plug means such that upon rotation of said locking means to said second position, said locking means engages said interior surface of said heat exchange tube wrapper.

10. A steam generator as set forth in claim 7, wherein: said first and second positions are located 180° apart.

11. A steam generator as set forth in claim 10, further comprising:
    slot means defined within interior face of said first cylindrical portion of said plug means for retaining said locking means within said diametrically opposed first and second positions.

12. A steam generator as set forth in claim 11, further comprising:
    shaft means, having at least one threaded end, upon which said locking means is disposed, and defining the rotational axis of said locking means; and
    nut means threadedly engaged with said threaded end of said locking means shaft means for determining the engagement or disengagement of said locking means with or from said plug means slot means.

13. A steam generator as set forth in claim 12, further comprising:
  washer means interposed between, and fixedly secured to, said nut means and said plug means for preventing retrograde rotation of said nut means relative to said threaded shaft means.

14. A steam generator as set forth in claim 12, further comprising:
  threaded extension means defined upon said shaft means; and
  an extension rod threadedly engaged with said threaded extension means for manipulating said locking means relative to said plug means.

15. A steam generator as set forth in claim 14, further comprising:
  an outer shell disposed substantially concentrically about said heat exchange tube wrapper;
  means defining a penetration within said outer shell; and
  said extension rod is disposed through said outer shell penetration,
  whereby said locking means can be manipulated within said heat exchange tube wrapper from a position external to said steam generator outer shell.

16. A method of installing a steam generator heat exchange tube wrapper closure within a penetration defined within said wrapper, comprising the steps of:
  providing a penetration plug with a locking member rotatably mounted thereon between first and second positions, said penetration plug having a first portion of a predetermined size slightly less than that of said penetration, and a second portion of a predetermined size greater than that of said first portion so as to define an annular shoulder portion between said first and second plug portions;
  rotating said locking member to said first position so as to permit said locking member and said first plug portion to be inserted within and through said wrapper penetration while said annular shoulder portion of said plug engages the outer surface of said wrapper; and
  rotating said locking member to said second position so as to cause said locking member to engage the interior surface of said wrapper whereby said penetration plug will be retained upon said wrapper and within said wrapper penetration.

17. A method as set forth in claim 16, wherein:
  said first and second positions are located 180° apart.

18. A method as set forth in claim 16, wherein said steam generator further includes an outer shell disposed substantially concentrically about said heat exchange tube wrapper and having a penetration defined therein which is substantially coaxially aligned with said penetration defined within said wrapper, and said method further includes the steps of:
  providing said locking member with an extension rod which extends through said outer shell penetration; and
  providing said penetration plug with a handle which extends through said outer shell penetration,
  whereby manipulation of said penetration plug and said locking member within and relative to said heat exchange tube wrapper is able to be accomplished from a location external of said steam generator outer shell.

19. A method as set forth in claim 16, wherein said wrapper penetration is disposed at a predetermined angle with respect to the exterior and interior surfaces of said wrapper, and said method further includes the step of:
  providing said locking member and said penetration plug with surfaces disposed at predetermined angles which are the same as said predetermined angle of said wrapper penetration such that said penetration plug and said locking member can properly engage said interior and exterior surfaces of said wrapper.

* * * * *